Feb. 19, 1952 — B. R. LAMB — 2,586,350
CRAB TRAP
Filed Jan. 18, 1950 — 2 SHEETS—SHEET 1

Bert R. Lamb
INVENTOR.

Feb. 19, 1952   B. R. LAMB   2,586,350
CRAB TRAP
Filed Jan. 18, 1950   2 SHEETS—SHEET 2
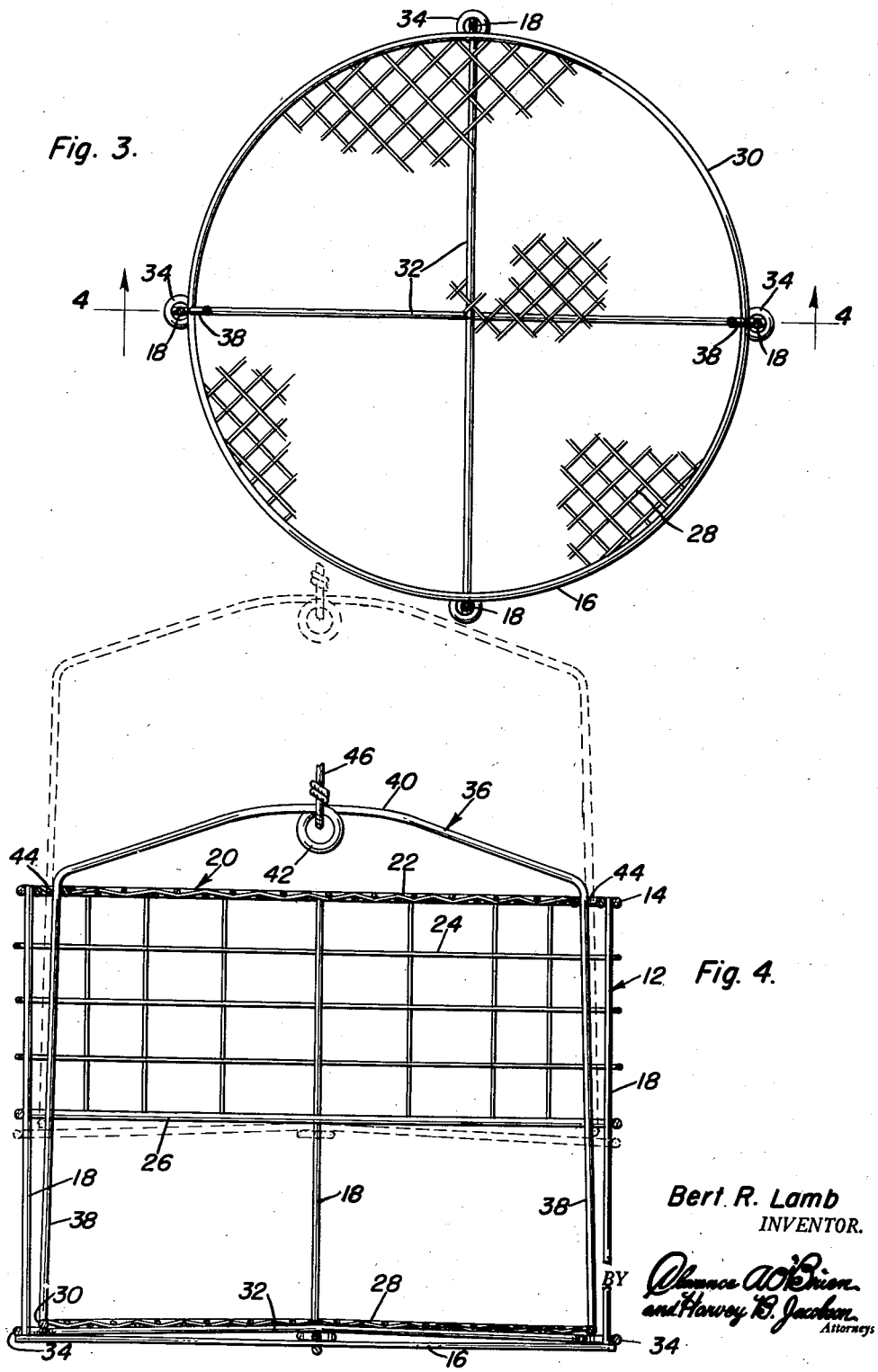
Bert R. Lamb
INVENTOR.

Patented Feb. 19, 1952

2,586,350

UNITED STATES PATENT OFFICE 2,586,350

CRAB TRAP

Bert R. Lamb, Wildwood, N. J.

Application January 18, 1950, Serial No. 139,300

1 Claim. (Cl. 43—61)

This invention relates to new and useful improvements and structural refinements in traps, and the principal object of the invention is to facilitate convenient, expeditious and efficient trapping of crabs.

This object is achieved by the provision of a trap including a bottomless housing having downwardly projecting frame members, together with a bottom wall or platform which is slidable upwardly on the frame members to a position wherein it constitutes a closure for the open bottom of the housing, so that when crabs approach the trap and walk on the bottom wall or platform, a simple actuation of a pull line connected to the platform causes the latter to slide upwardly and confine the crabs to the housing of the trap which, as a whole, may be subsequently lifted out of the water by means of the same pull line.

Some of the advantages of the invention reside in its simplicity of construction, in its simple and efficient operation as aforesaid, and in its adaptability to economical manufacture.

With the above more important objects and features in view and such other objects and features as may become apparent as this specification proceeds, the invention consists essentially in the construction and arrangement of parts as shown in the accompanying drawings, in which:

Figure 3 is a horizontal sectional view, taken substantially in the plane of the line 3—3 in Figure 2; and Figure 4 is a vertical sectional view, taken substantially in the plane of the line 4—4 in Figure 3.

Like characters of reference are employed to designate like parts in the specification and throughout the several views.

Figure 1:
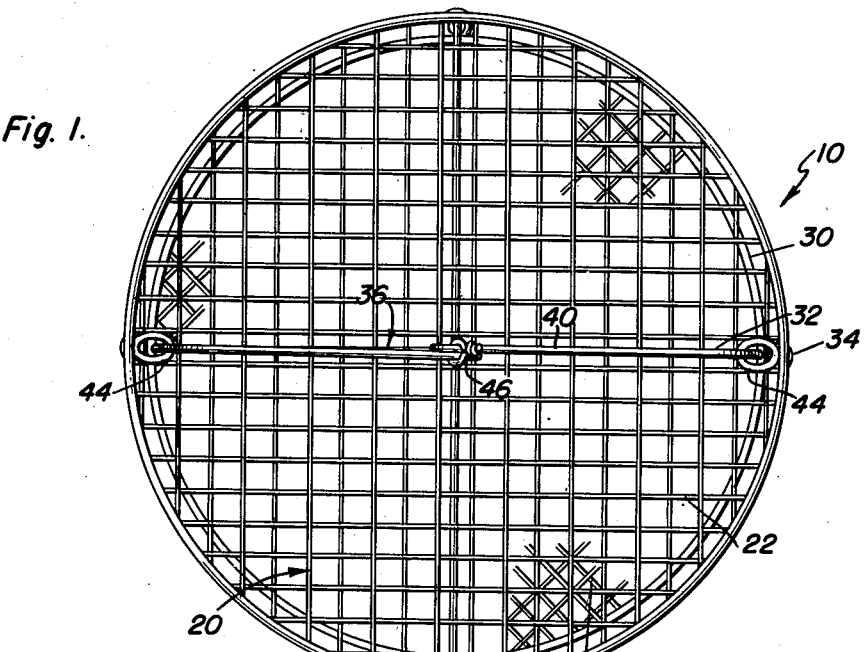
Figure 1 is a top plan view of the invention.
Figure 2:
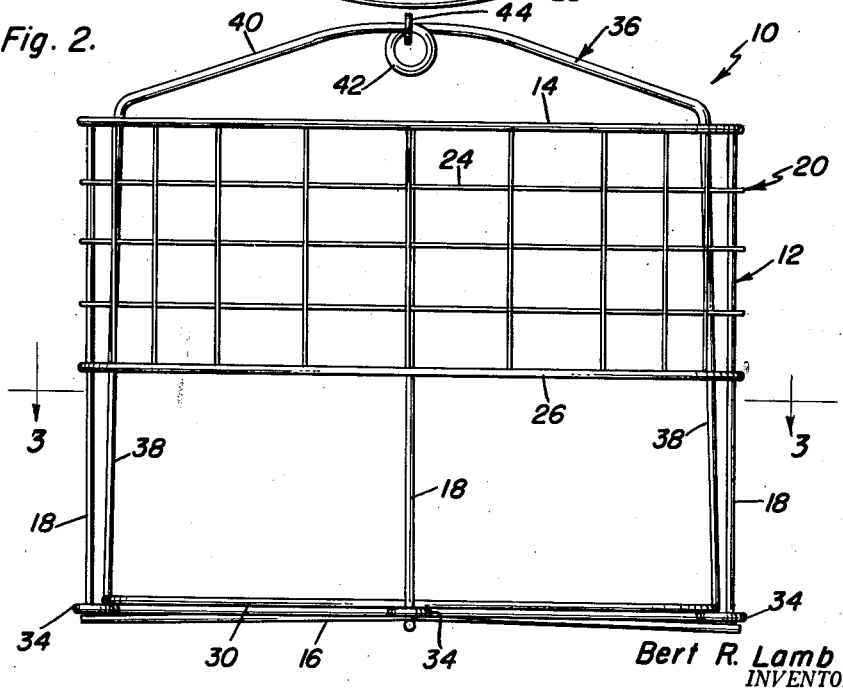
Figure 2 is a side elevational view thereof.

Referring now to the accompanying drawings in detail, the invention consists of a crab trap designated generally by the reference character 10, the same embodying in its construction a wire rod frame 12 constituting a trap chamber element which comprises a circular upper member 14, a circular lower member 16, and a plurality of vertical rods 18 rigidly securing the upper and lower members together.

The entire frame 12 is preferably of a welded or soldered construction and while the upper frame member 14 is substantially circular, as aforesaid, the lower frame member 16 simply assumes the form of crossed rods or bars which are secured at their outer ends to the lower ends of the upright members 18.

The upper portion of the frame 12 carries a foraminous housing 20 which has an open bottom and is defined by a top wall 22 and a marginal or peripheral wall 24. The top wall 22 of the housing is suitably secured to the upper frame member 14, while the marginal wall 24 is secured to the upright members 18, there being provided at the lower edge of the marginal wall 24 and annular reinforcing member 26.

The upright members 18 of the frame 12 project downwardly below the reinforcing member 26 of the housing 20, and a crab receiving platform or bottom wall 28 is adapted to rest on the bottom frame member 16. This platform or bottom wall is also of foraminous construction and is mounted upon a circular frame or annulus 30 reinforced by a plurality of cross-bars 32.

A plurality of guide rings 34 are secured to the annulus 30 of the bottom wall 28 and are slidable on lower end portions of the upright frame members 18, whereby the bottom wall 28 may be raised from its lowered position to a position wherein it abuts the reinforcing member 26 and affords a closure for the open bottom of the housing 20.

Sliding of the bottom wall 28 on the upright members 18 is effected by an inverted, substantially U-shaped yoke 36 which includes a pair of side arms 38 and a transverse bight portion 40, the bight portion 40 being provided intermediate its ends with an eye or loop 42, while the side arms 38 are rigidly secured at their lower ends to the annulus 30 of the bottom wall 28.

The bight portion 40 is, of course, disposed above the top wall 22 of the housing 20, and the side arms 38 are freely slidable in relatively large guide rings 44 which are welded or otherwise suitably secured to the foraminous top wall 22 of the housing.

A suitable pull line or cable 46 is connected to the loop or eye 42, and when the invention is placed in use the entire device is lowered in water by means of the pull line until the bottom frame member 16 rests on the bottom or bed of the river, stream, or the like, and, needless to say, as the line 46 continues to be payed out, the bottom wall 28 will gravitate until it rests on the bottom frame member 16.

Thereupon, when a crab or crabs walk on the bottom wall or platform 28, the line 46 is simply pulled upwardly so as to raise the bottom wall to a position wherein the crabs thereon are trapped in the housing 20, and as the line 46 continues to be pulled upwardly, the entire trap may, of course, be drawn out of the water.

It is believed that the advantages and use of the invention will be clearly apparent from the foregoing disclosure and, accordingly, further description thereof at this point is deemed unnecessary.

Having described the invention, what is claimed as new is:

A crab trap of the character described comprising a substantially cylindrical trap chamber element including a foraminous top and foraminous peripheral walls, said trap chamber element being open at its bottom, vertical rods fixed to the trap chamber element at circumferentially spaced points and depending therefrom for supporting said trap chamber element in an elevated position, guide rings fixed on the foraminous top of the chamber element, crossed metallic rods extending between the lower ends of the supporting rods, a foraminous bottom for the chamber element operable vertically between the supporting rods and engageable, when in lowered position, on the crossed rods, other guide rings fixed on said foraminous bottom and slidably encircling the lower portions of the supporting rods, and a yoke for elevating the bottom to closed position beneath the trap chamber element, the legs of said yoke extending slidably through the first-named guide rings and having their free ends fixed to the bottom.

BERT R. LAMB.

REFERENCES CITED

The following references are of record in the file of this patent:

UNITED STATES PATENTS

| Number | Name | Date |
|---|---|---|
| 413,877 | Thrift | Oct. 29, 1889 |
| 713,890 | Koch | Nov. 18, 1902 |
| 1,488,331 | Ferris | Mar. 25, 1924 |
| 2,473,910 | Ruiz | June 21, 1949 |
| 2,489,856 | Buford | Nov. 29, 1949 |